United States Patent
Lee et al.

(10) Patent No.: US 9,232,538 B2
(45) Date of Patent: Jan. 5, 2016

(54) METHOD AND APPARATUS FOR TRANSCEIVING DATA IN A RADIO ACCESS SYSTEM WHICH SUPPORTS A MULTI-RADIO ACCESS TECHNOLOGY

(75) Inventors: Eunjong Lee, Anyang-si (KR); Heejeong Cho, Anyang-si (KR); Kiseon Ryu, Anyang-si (KR); Youngsoo Yuk, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 128 days.

(21) Appl. No.: 13/992,644

(22) PCT Filed: Dec. 9, 2011

(86) PCT No.: PCT/KR2011/009516
§ 371 (c)(1),
(2), (4) Date: Jun. 7, 2013

(87) PCT Pub. No.: WO2012/078008
PCT Pub. Date: Jun. 14, 2012

(65) Prior Publication Data
US 2013/0250905 A1 Sep. 26, 2013

Related U.S. Application Data

(60) Provisional application No. 61/421,632, filed on Dec. 10, 2010.

(51) Int. Cl.
| | |
|---|---|
| *H04W 4/00* | (2009.01) |
| *H04W 74/00* | (2009.01) |
| *H04W 48/18* | (2009.01) |
| *H04W 52/02* | (2009.01) |
| *H04W 28/18* | (2009.01) |
| *H04W 88/06* | (2009.01) |

(52) U.S. Cl.
CPC ............ *H04W 74/004* (2013.01); *H04W 28/18* (2013.01); *H04W 48/18* (2013.01); *H04W 52/0229* (2013.01); *H04M 2250/06* (2013.01); *H04W 74/00* (2013.01); *H04W 88/06* (2013.01); *Y02B 60/50* (2013.01)

(58) Field of Classification Search
CPC .......... H04W 72/042; H04W 72/0406; H04W 72/0413; H04W 76/023; H04L 5/0053
USPC ................... 370/329, 331, 332; 455/436, 434
See application file for complete search history.

(56) References Cited

U.S. PATENT DOCUMENTS

| | | | |
|---|---|---|---|
| 2005/0153692 A1* | 7/2005 | Hwang et al. ................. | 455/434 |
| 2007/0204049 A1* | 8/2007 | Herrod .......................... | 709/227 |
| 2008/0062933 A1 | 3/2008 | Liu et al. | |
| 2009/0156210 A1 | 6/2009 | Ponce de Leon et al. | |

(Continued)

*Primary Examiner* — Andrew Chriss
*Assistant Examiner* — Atique Ahmed
(74) *Attorney, Agent, or Firm* — Lee, Hong, Degerman, Kang & Waimey

(57) ABSTRACT

The present description relates to a method in which a multi-radio access technology (RAT) terminal transceives data to/from a first base station that supports a first RAT and to/from a second base station that supports a second RAT, in a radio access system which supports multi-radio access technologies (RATs). The multi-RAT terminal transmits, to the first base station, a multi-RAT capability negotiation request message containing control information indicating the second base station which is preferred for communication, thereby simplifying a scanning process for the second base station and thus reducing the power consumption of the multi-RAT terminal.

12 Claims, 7 Drawing Sheets

(56) References Cited

U.S. PATENT DOCUMENTS

| | | |
|---|---|---|
| 2009/0279504 A1 | 11/2009 | Chin et al. |
| 2009/0280812 A1* | 11/2009 | Cheng et al. ............... 455/436 |
| 2010/0008324 A1 | 1/2010 | Lee et al. |
| 2010/0304748 A1* | 12/2010 | Henttonen et al. ........... 455/436 |
| 2011/0310844 A1* | 12/2011 | Rexhepi ....................... 370/331 |
| 2011/0310851 A1* | 12/2011 | Klingenbrunn et al. ...... 370/332 |
| 2012/0004004 A1* | 1/2012 | Song ..................... H04W 48/20 455/515 |

\* cited by examiner

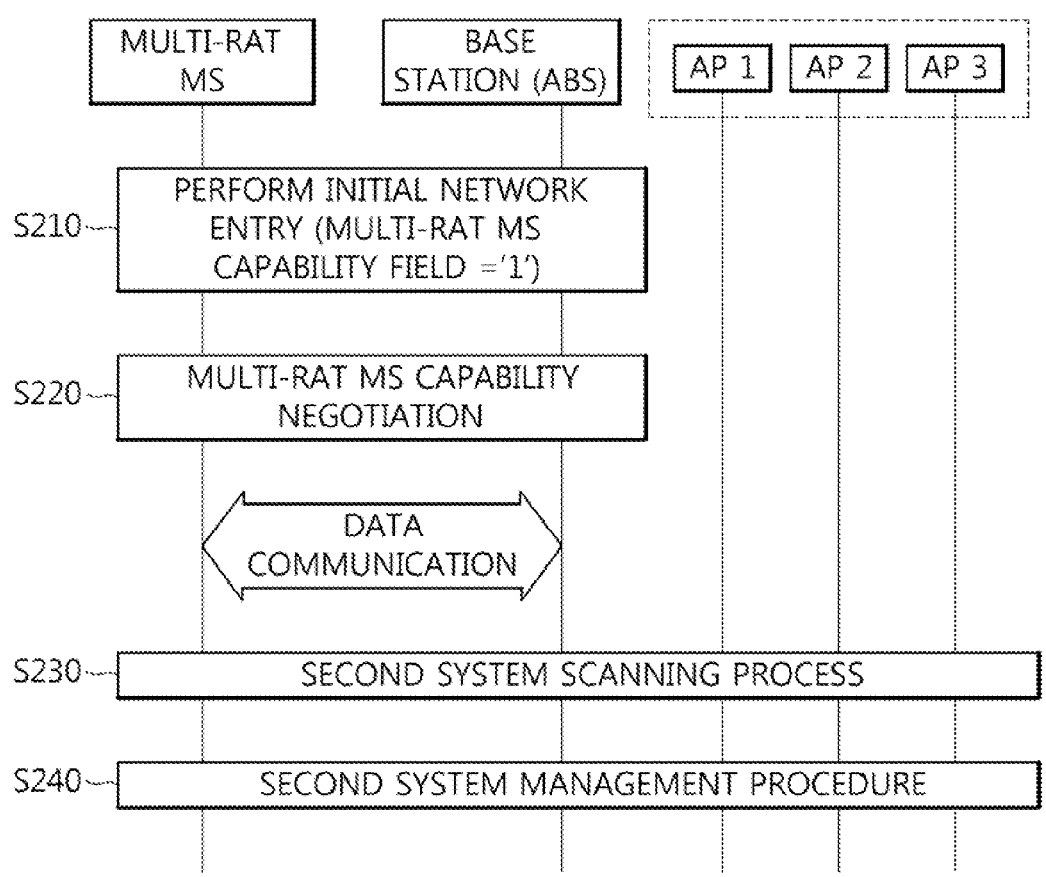

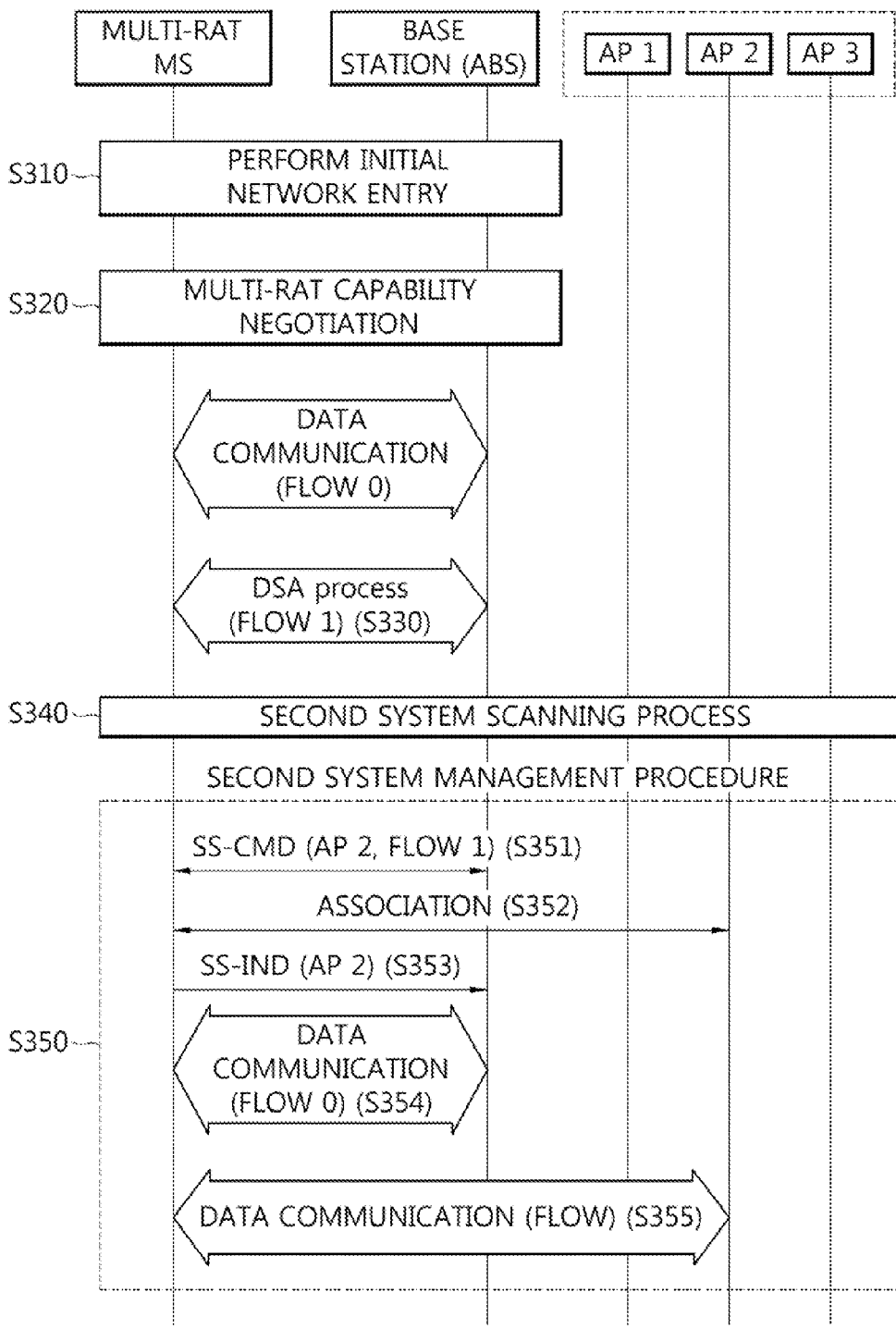

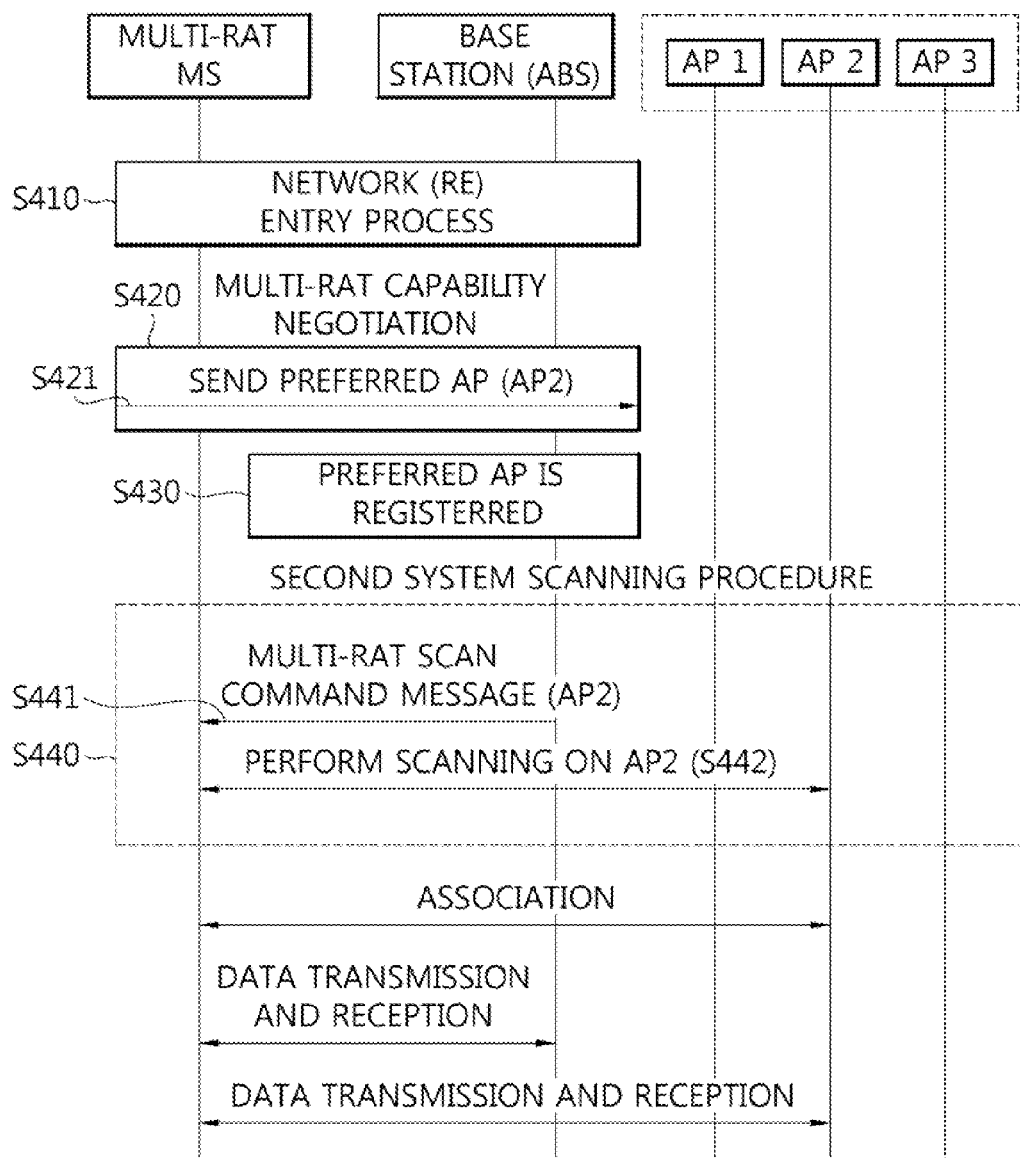

METHOD AND APPARATUS FOR TRANSCEIVING DATA IN A RADIO ACCESS SYSTEM WHICH SUPPORTS A MULTI-RADIO ACCESS TECHNOLOGY

CROSS-REFERENCE TO RELATED APPLICATIONS

This application is the National Stage filing under 35 U.S.C. 371 of International Application No. PCT/KR2011/009516, filed on Dec. 9, 2011, which claims the benefit of U.S. Provisional Application Ser. No. 61/421,632, filed on Dec. 10, 2010, the contents of which are all hereby incorporated by reference herein in their entirety.

BACKGROUND OF THE INVENTION

1. Field of the Invention

The present invention relates to a radio access system supporting multi-radio access technology (RAT) and, more particularly, to a method and apparatus for transmitting and receiving data over two or more heterogeneous networks.

2. Related Art

In a conventional radio communication environment supporting two or more heterogeneous networks, although a terminal has capabilities to access multi-RAT, the terminal is unable to access the multi-RAT at the same time and transmit and receive data to and from the two or more heterogeneous networks at the same time.

That is, a conventional terminal supporting multi-RAT accesses any one RAT based on switching and transmits and receives data over one network. Accordingly, if a terminal having multi-RAT capabilities transmits and receives data over a specific network and transmits and receives data over a network different from the specific network, the transmission and reception of data over any one network is stopped.

Accordingly, in the prior art, a terminal having capabilities supporting two or more heterogeneous networks is able to perform communication by using different networks, but efficiency is limited because the terminal operates based on simple switching.

Furthermore, since different networks independently operate, an inefficient operation is performed from a viewpoint of the overall flow management of a terminal.

Accordingly, a method of a mobile station (MS), having a multi-RAT capability, transmitting and receiving data at the same time over 2 or more networks has been defined. However, overall contents of a multi-RAT capability negotiation process procedure have been defined, but detailed solutions to detailed contents and method of each operation have not been proposed.

In particular, it is clear that a multi-RAT MS must perform a scanning procedure on a secondary system in order to transmit and receive data to and from heterogeneous networks, that is, a primary system and the secondary system at the same time, but there is no detailed solution regarding that the a multi-RAT MS has to perform scanning on the secondary system through what method.

Furthermore, the number of APs belonging to the coverage of a cellular network is gradually increased, and that an MS scans all neighbor APs can be inefficient in terms of power efficiency.

SUMMARY OF THE INVENTION

A multi-RAT MS can be connected with an AP under the control of an ABS in an environment in which the multi-RAT MS transmits and receives data using a first base station (ABS) and a second base station (AP), and in such environment, there is a need for technology in which the ABS can scan only a specific AP in order to reduce power consumption.

Accordingly, the present invention provides a method of a multi-RAT MS efficiently performing scanning on APs neighbor to an ABS by transmitting a preferred AP or information about the preferred AP to the ABS.

Furthermore, the present invention provides a method of transmitting information related to an AP, preferred by a multi-RAT MS, to the multi-RAT MS.

In an aspect, a method of a multi-radio access technology (multi-RAT) mobile station transmitting and receiving data to and from a first base station supporting first radio access technology and a second base station supporting second RAT in a radio access system supporting multiple RATs is provided. The method includes performing a network entry process with the first base station, transmitting a multi-RAT capability negotiation request message, comprising control information indicating a second base station preferred to communicate with, to the first base station, receiving a multi-RAT capability negotiation response message, corresponding to the multi-RAT capability negotiation request message, from the first base station, performing a scanning procedure on one or more second base stations included in a coverage of the first base station, performing an access procedure with any one of the one or more second base stations, and simultaneously transmitting and receiving data to and from the first base station and the second base station accessed through the access procedure.

Further, the one or more base stations and any one of the one or more base stations may be a second base station corresponding to the control information.

Further, the second base station preferred to communicate with may be a public or private access point (AP).

Further, the control information may be a service set identifier (SSID), a basic service set identifier (BSSID), or a media access control (MAC) address if the second base station preferred to communicate with is a public AP, and the control information may be a BSSID or MAC address if the second base station preferred to communicate with is a private AP.

Further, the method may further include receiving information related to the second base station preferred to communicate with from the first base station. The information related to the second base station may be at least one of a beacon interval, a scan type, probe delay, a list of channels to be scanned, and information about a minimum or maximum time during which scanning has to be performed in each channel.

Further, the method may further include performing a dynamic service process with the first base station in order to add or change a service flow. The control information may be information indicating the added or changed service flow and the second base station preferred to communicate with.

Further, the first RAT may be RAT supporting IEEE 802.16, and the second RAT may be RAT supporting IEEE 802.11.

In another aspect, a method of a first base station controlling data transmission and reception between a mobile station and a second base station in a radio access system comprising the mobile station supporting multi-radio access technology (multi-RAT), the first base station supporting first RAT, and the second base station supporting second RAT is provided. The method includes performing a network entry process with the mobile station, receiving a multi-RAT capability negotiation request message, comprising control information indicating a second base station preferred to communicate with, from the mobile station, transmitting a multi-RAT capability negotiation response message, corresponding to the multi-RAT capability negotiation request message, to the mobile station, and transmitting a multi-RAT scan command message, instructing scanning to be performed on a second base station corresponding to the control information, to the mobile station.

Further, the multi-RAT scan command message may be transmitted to the mobile station if the second base station corresponding to the control information has been registered.

Further, the method may further include receiving a result of the scanning on the second base station, corresponding to the control information, from the mobile station, and comparing the result of the scanning with a predefined threshold value.

Further, the method may further include transmitting a message, instructing an association procedure to be performed with the second base station corresponding to the control information, to the mobile station, if, as a result of the comparison, the result of the scanning is greater than the predefined threshold value.

Further, the method may further include transmitting a message, instructing periodic scanning for the second base station corresponding to the control information, to the mobile station, if, as a result of the comparison, the result of the scanning is smaller than the predefined threshold value.

Further, the method may further include transmitting information related to the second base station preferred to communicate with to the mobile station. The information related to the second base station may be at least one of a beacon interval, a scan type, probe delay, a list of channels to be scanned, and information about a minimum or maximum time during which scanning has to be performed in each channel.

In another aspect, a mobile station for transmitting and receiving data to and from a first base station supporting first radio access technology (RAT) and a second base station supporting second RAT in a radio access system supporting multiple RATs is provided. The mobile station includes a radio frequency unit for transmitting and receiving radio signals with an outside, and a controller coupled with the radio communication unit, and configured for controlling the radio frequency unit to transmit a multi-RAT capability negotiation request message, comprising control information indicating a second base station preferred to communicate with, to the first base station, and performing scanning on a second base station corresponding to the control information.

The present invention is advantageous in that the power consumption of a multi-RAT MS can be reduced by performing scanning on only a specific AP located near an ABS using information about a preferred AP.

Furthermore, the present invention is advantageous in that a multi-RAT MS can efficiently transmit and receive data to and from an ABS and an AP because information about a frequently accessed AP is used.

Furthermore, the present invention is advantageous in that a multi-RAT MS can detect a preferred AP more rapidly because information related to the preferred AP is transmitted to the multi-RAT MS that has sent the preferred AP.

That is, a multi-RAT MS is first associated with a preferred AP if the preferred AP is located in a specific area because the multi-RAT MS usually stays long in an area belonging to a preferred AP, and more efficient service in terms of the rate can be provided to a user through the mapping of an Internet telephone and a cellular network telephone.

BRIEF DESCRIPTION OF THE DRAWINGS

FIG. 2 is a flowchart showing a method of a multi-RAT MS transmitting and receiving data through a primary system and a secondary system.

FIG. 3 is another flowchart showing a method of a multi-RAT MS transmitting and receiving data through a primary system and a secondary system.

FIG. 4 is a flowchart showing a scanning procedure performed by a multi-RAT MS according to an embodiment of the present invention.

DESCRIPTION OF EXEMPLARY EMBODIMENTS

Figure 1A:
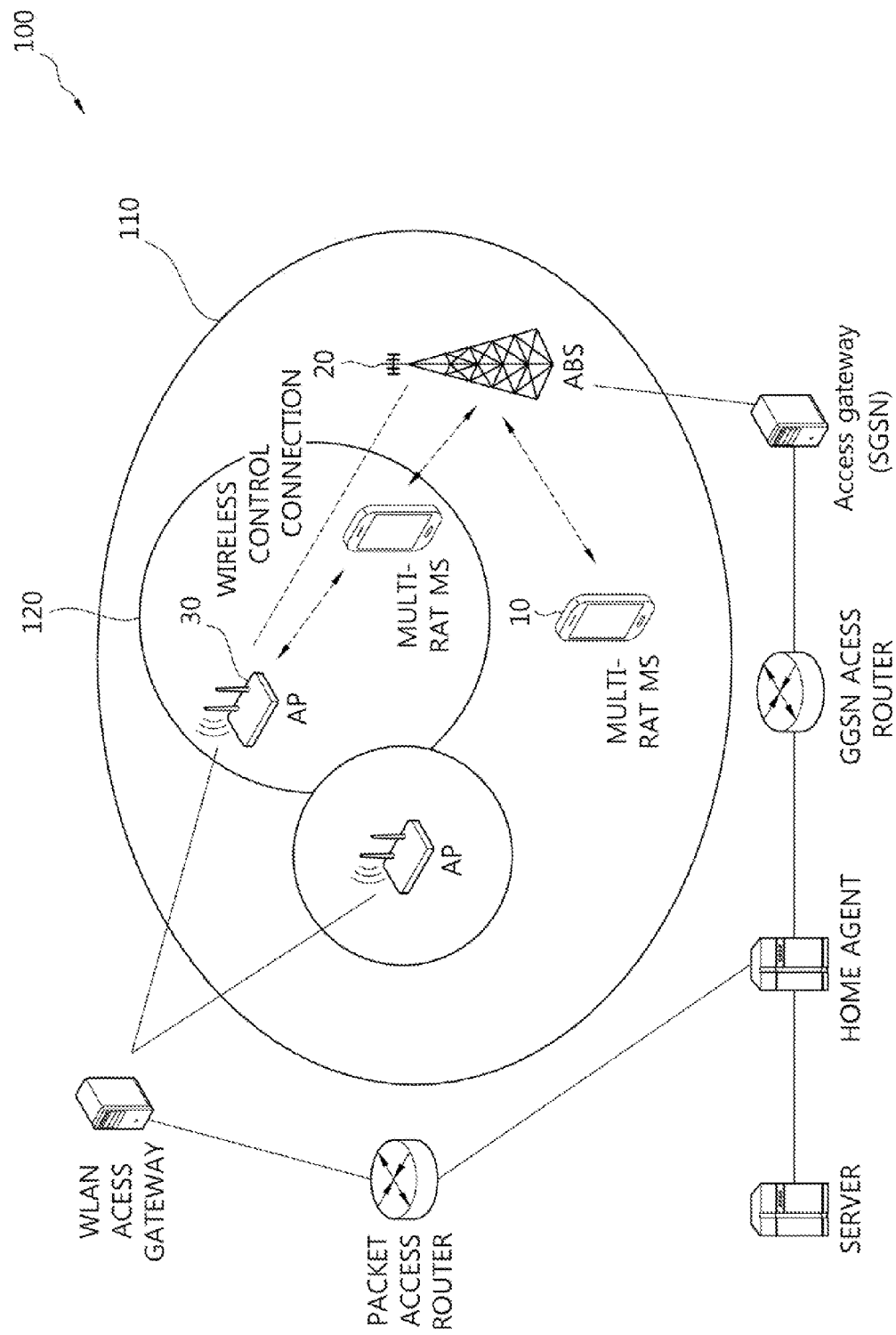
FIGS. 1(a) and 1(b) are conceptual diagrams showing a multi-RAT network to which an embodiment of the present invention can be applied.

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e.

The UTRA is part of a universal mobile telecommunications system (UMTS).

3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, preferred embodiments according to the present invention are described in detail with reference to the accompanying drawings. The same or similar elements are assigned the same reference numerals irrespective of their reference numerals, and a redundant description thereof is omitted. Furthermore, in describing the present invention, a detailed description of the known functions and constructions will be omitted if it is deemed to make the gist of the present invention unnecessarily vague. Furthermore, the accompanying drawings are provided to help easily understand the spirit of the present invention, and it is to be noted that the spirit of the present invention should not be limited by the spirit of the present invention. The spirit of the present invention should be interpreted as being extended up to all changes, equivalents to substitutes other than the accompanying drawings.

A method in which a mobile station (MS) accesses two or more heterogeneous networks (or multi-RAT) and transmits and receives data over the networks at the same time in a multi-RAT network according to an embodiment of the present invention is described below.

At first, a multi-radio access technology (multi-RAT) network according to an embodiment of the present invention is described.

Figure 1B:
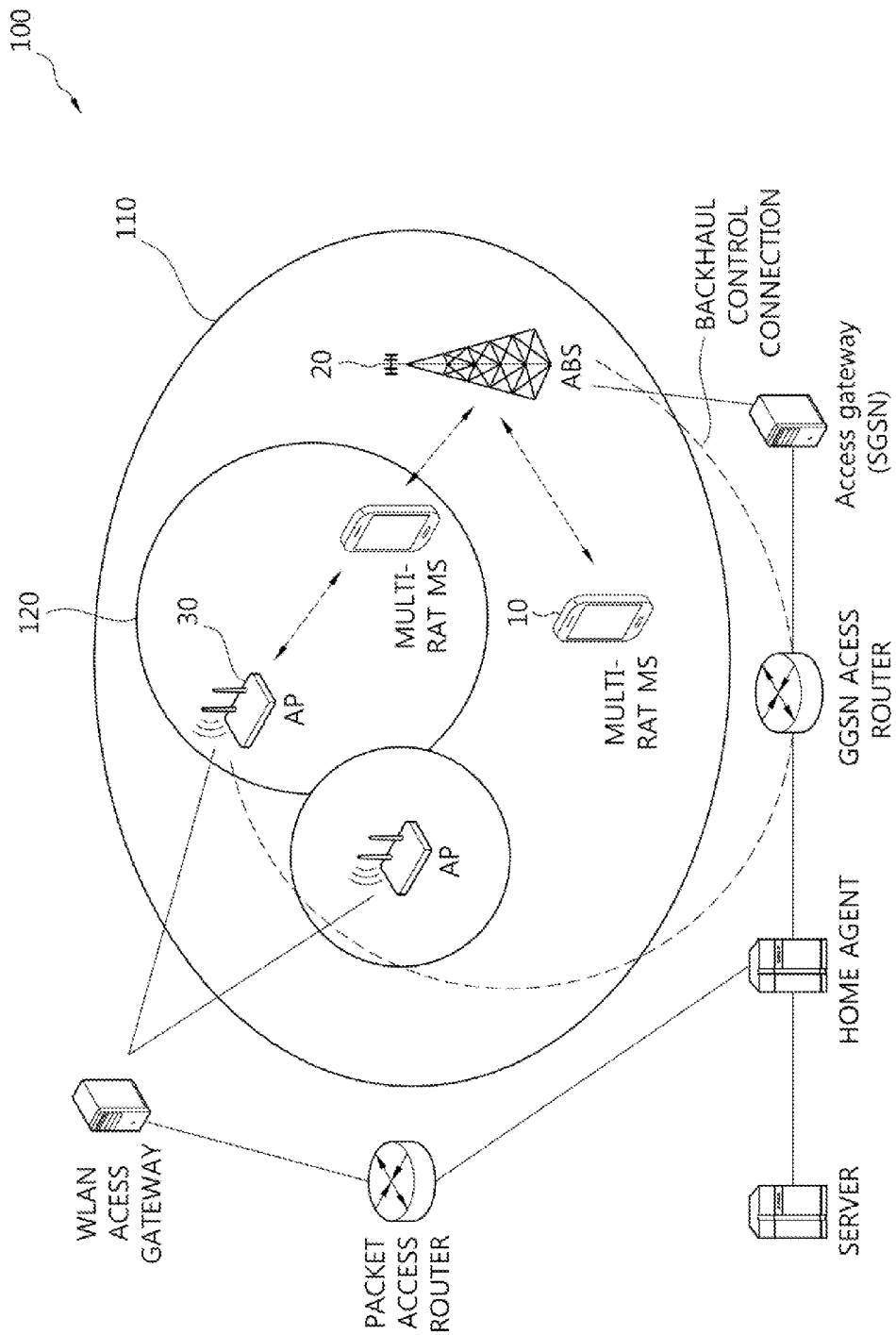

FIGS. 1(a) and 1(b) are conceptual diagrams showing a multi-RAT network to which an embodiment of the present invention can be applied.

A multi-radio access technology (hereinafter referred to as 'multi-RAT') network refers to a radio communication environment in which two or more heterogeneous networks are present and an MS is able to access two or more heterogeneous networks and perform communication at the same time.

Here, an MS capable of performing communication with the two or more heterogeneous networks at the same time is called a 'multi-RAT MS' or 'a multi-system MS'.

A heterogeneous network (or a heterogeneous system) refers to a network using a communication method different from a communication method used in a specific network on the basis of the specific network.

For example, a WiMAX network, that is an example of a mobile communication system, and a Wi-Fi network using a Wi-Fi network, corresponds to heterogeneous networks.

RAT is a technique type used in radio access. For example, RAT can include a GSM/EDGE radio access network (GERAN), a UMTS terrestrial radio access network (UTRAN), an evolved-UMTS terrestrial radio access network (E-UTRAN), WiMAX, LTE (-A), and Wi-Fi. That is, a GERAN, a UTRAN, an E-UTRAN, WiMAX, and/or Wi-Fi are mixed in the same area.

As shown in FIG. 1, a multi-RAT network 100 can include a primary system 110 and a secondary system 120.

Here, the primary system 110 and the secondary system 120 can be represented by a first network and a second network, respectively. The primary system 110 can include a multi-RAT MS 10, a base station 20, and the secondary system 120, and the secondary system 120 can include the multi-RAT MS 10 and an AP 30.

The primary system is a system having a wide range of coverage and can be a mobile communication system. For example, the primary system can be a WiMAX or LTE (-A) system. Furthermore, the primary system refers to a system always having a status with the multi-RAT MS. That is, the primary system refers to a system which maintains an activation state, a sleep mode state, or an idle mode state with the multi-RAT MS.

The secondary system is a system having a small range of coverage and can be a WLAN communication system. For example, the secondary system can be a Wi-Fi system. That is, the secondary system refers to a system that can be added to or deleted from the multi-RAT network if necessary. Furthermore, the secondary system can be used for the transmission and reception of data which basically requires a higher bandwidth (BW). Accordingly, a specific flow (QoS) can be mapped for the use of the secondary system.

Here, a base station of the secondary system, for example, an access point (AP) can operate like an MS having capabilities capable of communicating with the primary system.

Furthermore, in a multi-RAT network, the primary system and the secondary system are associated with each other in a wired or wireless manner. That is, a base station in the primary system and a base station in the secondary system can be associated with each other over a backbone network (FIG. 1(b)) can be associated with each other wirelessly (FIG. 1(a)).

Hereinafter, it is assumed that the primary system is a WiMAX system and a secondary system is a Wi-Fi system unless otherwise described, for convenience of description. Accordingly, a base station corresponding to the primary system is called an 'ABS', and a base station corresponding to the secondary system is called an 'AP'. Furthermore, access to the primary system can be used as the same meaning as access to the ABS, and access to the secondary system can be used as the same meaning as access to the AP.

FIG. 2 is a flowchart showing a method of a multi-RAT MS transmitting and receiving data through a primary system and a secondary system.

Referring to FIG. 2, the multi-RAT MS performs an initial network entry process with the ABS (S210).

The multi-RAT MS sends an indicator, indicating that the multi-RAT MS is an MS supporting multi-RAT, to the ABS through the initial entry process with the ABS. Here, the indicator can be a multi-RAT MS capability field. Furthermore, the indicator, that is, the multi-RAT MS capability field, can have a size of one bit.

Furthermore, the indicator can be transmitted through a registration procedure performed during the initial network entry process with the ABS. In this case, the indicator can be transmitted to the ABS through a registration request or registration response (REG-REQ/RSP) message.

For example, when the indicator is set to '1', it indicates that an MS is an MS supporting multi-RAT. When the indicator is set to '0', it indicates that an MS is an MS not supporting multi-RAT.

Furthermore, when an REG-REQ message or an REG-RSP message including the indicator (e.g., set to '1') indicating capabilities supporting multi-RAT is received from the multi-RAT MS, the ABS may send information, notifying that an additional multi-RAT capability negotiation process for supporting the multi-RAT MS will be performed, to the multi-RAT MS after the initial network entry process is finished or after a lapse of some time.

For example, when the notification information is set to '1', it indicates that the ABS and the multi-RAT MS perform an additional capability negotiation process in order to support multi-RAT. When the notification information is set to '0', it indicates that an additional capability negotiation process does not need to be performed.

Next, if the multi-RAT MS finishes the initial network entry process with the ABS, the multi-RAT MS and the ABS perform a multi-RAT capability negotiation process (S220). Here, the multi-RAT capability negotiation process is commonly performed after a network (re)entry process is finished, but can be performed during a network (re)entry process with the ABS.

For example, if the multi-RAT capability negotiation process is performed during the network (re)entry process, the multi-RAT MS and the ABS can perform the multi-RAT capability negotiation process through the registration procedure process of the ABS and the multi-RAT MS. In this case, the multi-RAT MS and the ABS transmit and receive pieces of information regarding a multi-RAT capability negotiation through REG-REQ/REG-RSP messages.

The multi-RAT capability negotiation process of the multi-RAT MS and the primary system are described in more detail later.

Next, the multi-RAT MS performs an AP scanning process for access to the secondary system based on information related to the secondary system received from the ABS (S230).

Here, the multi-RAT MS performs a scanning process on neighbor APs periodically or in an event-triggered way for access to the secondary system.

First, it is assumed that association with all data transmitted to the multi-RAT MS is performed through a dynamic service (DSx) procedure with the ABS of the primary system and communication with the secondary system of the multi-RAT MS sends data regarding a specific flow to the secondary system under the determination of the ABS of the primary system.

Next, the multi-RAT MS performs a management (or operation) procedure with the secondary system (S240). Here, the management procedure with the secondary system refers to processes, such as association, disassociation, and re-association with the secondary system of the multi-RAT MS. Here, the management procedure of the secondary system is controlled by the primary system.

After performing the access procedure with the secondary system, the multi-RAT MS transmit and receive data through the AP of the secondary system.

Here, in order to access the secondary system, the multi-RAT MS has to receive an acknowledgement response for the access to the secondary system from the primary system.

That is, as described above, the ABS selects an AP that the multi-RAT MS accesses and checks the state of the selected AP before transmitting the acknowledgement response to the access to the secondary system to the multi-RAT MS. If, as a result of the check, the access to the selected AP is possible, the ABS can send information about the multi-RAT MS to the selected AP in advance.

Furthermore, when the ABS sends the acknowledgement response to the multi-RAT MS, the ABS can also send information that is necessary or useful for the multi-RAT MS to access the AP.

For example, the necessary or useful information can be an SSID, the MAC address of the AP, WEP key, or channel number (or frequency information), the protocol version (11a/b/n . . . ) of the AP, and offset information between a beacon and the frames of the base station (a relative location of the beacon is indicated by a difference with a specific frame time and transmitted).

Furthermore, if the multi-RAT MS recognizes that the multi-RAT MS has entered the coverage of the secondary system as a result of the scanning on the AP for the access to the secondary system, the multi-RAT MS may request access to the secondary system to the ABS of the primary system.

A message necessary for the management procedure of the secondary system can include the following messages.

1. A secondary system request (SS_REQ) message
: is used for the multi-RAT MS to request access to the AP.
2. A secondary system command (SS_CMD) message
: is a message used to manage access to the AP and is used for association, disassociation, or re-association with or from the AP.
3. A secondary system indication (SS_IND) message
: is a message used as a response to the secondary system command message and is used for the multi-RAT MS to inform the base station of an association success, a disassociation success, or a re-association success with the AP.

Next, if the access to the AP of the secondary system is successful, the multi-RAT MS is able to transmit and receive data to and from the primary system and transmit and receive data to and from the secondary system at the same time. Here, the data transmitted and received to and from the multi-RAT MS through the AP is controlled by the primary system.

A multi-RAT capability negotiation process between the multi-RAT MS and the ABS is described in detail below.

As described above, the multi-RAT capability negotiation process between the multi-RAT MS and the ABS is performed after network (re)entry.

Here, in the case of the network re-entry, the multi-RAT capability negotiation process can be omitted. This is because to perform the same procedure already performed when the multi-RAT MS re-enters the same system over a network generates an unnecessary overhead because capability negotiations for multi-RAT have already been performed through the initial network entry procedure between the multi-RAT MS and the ABS.

Furthermore, in the case of a handover (HO), a target base station of the primary system can perform multi-RAT capability negotiations with the multi-RAT MS in advance over a backbone network from the serving base station of the primary system.

A process of the multi-RAT MS performing the multi-RAT capability negotiation process with the primary system can be as follows.

First, the ABS can send information related to the secondary system to the multi-RAT MS. That is, if the ABS has common information about the APs of the secondary system that have to be received by the multi-RAT MS, the ABS can send the AP information to the multi-RAT MS in a broadcast or unicast way.

Here, the information related to the secondary system refers to information about a heterogeneous system that belongs to the same coverage as the primary system. Here, the multi-RAT MS may not need to know all secondary systems included in the primary system and information related to the secondary systems. In this case, the ABS does not send all pieces of information about the secondary systems and related to the secondary systems, but can send a list of pieces of information related to (necessary for) the multi-RAT MS to the multi-RAT MS in a unicast way. In this case, the list can be transmitted in the multi-RAT capability negotiation process.

Next, the multi-RAT MS sends a multi-system capability request message to the ABS. The multi-system capability request message can include, for example, the 802.11 MAC address of the MS, existing access AP information, and protocol version information of 802.11. The 802.11MAC address is necessary for authentication information. If the existing access AP information is included in the multi-system capability request message, the multi-system capability request message is transmitted to only a base station to which the existing access AP belongs.

Next, the ABS sends a multi-system capability response message to the multi-RAT MS in response to the multi-system capability request message.

The multi-system capability response message can include information about candidate APs.

Furthermore, if the multi-RAT MS enters idle mode, the ABS can store information, obtained through the multi-RAT capability negotiation process with the multi-RAT MS, for a certain time. That is, the ABS can newly define a multi-RAT information retention timer, can store the obtained information until the multi-RAT information retention timer expires, and can discard the obtained information after the timer expires.

Accordingly, if the multi-RAT MS performs network re-entry with the ABS before the multi-RAT information retention timer expires, the multi-RAT capability negotiation process can be omitted.

An operation (or management) method of the secondary system is described in detail below. Here, the operation of the secondary system refers to association or disassociation between the secondary system and the multi-RAT MS and re-association between the multi-RAT MS and the secondary system, and the operation of the secondary system is controlled by the ABS, that is, the primary system.

As an example of the operation method of the secondary system, a process of the multi-RAT MS accessing (or associating with) the secondary system, that is, a process of the multi-RAT MS adding the secondary system and transmitting and receiving data to and from the primary system and the secondary system at the same time, is described.

In order to access the secondary system, the multi-RAT MS or the ABS can perform a multi-RAT association request. In this case, the multi-RAT MS or the ABS can perform a multi-RAT association request process through a secondary system access request/response message.

If a secondary system is added at the request of the multi-RAT MS, when the multi-RAT MS detects the secondary system satisfying a specific condition by performing scanning, the multi-RAT MS can request association with the secondary system to the ABS by sending a secondary system request message to the ABS.

Furthermore, if a secondary system is added at the request of the ABS, when the ABS detects that specific flow association is generated in the multi-RAT MS, the ABS checks the state of an AP that can be accessed to the multi-RAT MS.

If, as a result of the check, access to the multi-RAT MS is possible, the ABS can instruct association between the multi-RAT MS and the secondary system by sending a secondary system access command message to the multi-RAT MS.

Here, control of the multi-RAT MS for accessing multi-RAT, that is, the transmission of control information, is performed by the base station of the primary system. In this case, QoS for corresponding data has only to comply with a method supported by a primary system because the multi-RAT MS simply performs data transmission and reception with the secondary system. In this case, the transmission of the control information can be performed through the secondary system access command message.

Here, the secondary system access command message can include information about a selected AP, information about a flow transmitted to the secondary system, and an authentication method (an open system or a shared key).

Next, the multi-RAT MS completes access to a specific AP and a traffic stream (TS) configuration with reference to AP information within the secondary system command message in response to an access command of the secondary system of the ABS. For example, an ADDTS request/response process of 802.11e can be performed.

Next, the multi-RAT MS informs the ABS of a result of an association success for the specific AP.

In this case, the association success can be performed through a secondary system indication (SS_IND) message. The secondary system indication message can include a result of the mapping of a flow ID (FID) and an association ID (AID)/traffic stream ID (TSID) for a corresponding flow.

Next, the multi-RAT MS transmits and receives data for a specific flow through the secondary system. That is, the multi-RAT MS transmits and receives data to and from the primary system and the secondary system at the same time according to a data flow.

That is, in the case of DL data, the ABS sends the DL data to the multi-RAT MS through the AP.

Furthermore, in the case of UL data, data for a specific flow ID indicated by the ABS is transmitted through the secondary system, for example, over a WLAN.

Furthermore, the multi-RAT MS can perform re-association or disassociation with the AP by transmitting and receiving the secondary system command/indication messages to and from the ABS.

Furthermore, if the multi-RAT MS gets out of the secondary system, for example, a WLAN coverage while transmitting and receiving data to and from the AP and there is no neighbor AP nearby, the ABS can control seamless flow mobility between the AP and the ABS so that the data transmitted to and received from the AP is seamlessly transmitted through the ABS of the primary system.

Furthermore, if the multi-RAT MS detects a neighbor AP while transmitting and receiving data to and from the AP of the secondary system, the ABS can perform control so that the data now being transmitted to and received from the multi-RAT MS is seamlessly transmitted from the AP to the neighbor AP.

A method of releasing (or disassociating) the secondary system is described below.

If the multi-RAT MS determines that a channel state with the secondary system now being accessed thereto is not good, the multi-RAT MS performs scanning on neighbor secondary systems.

If the multi-RAT MS determines that there is no detected secondary system as a result of the scanning into the neighbor secondary systems, the multi-RAT MS disassociates the secondary system now being accessed thereto.

In this case, if data corresponding to a specific flow of the primary system is being transmitted and received through the secondary system and the MS is unable to perform an HO to a neighbor AP secondary system, the ABS has to support multi-RAT seamless flow mobility so that seamless flow mobility can be performed without a data loss for the corresponding flow.

Or, in this case, when the multi-RAT MS completes the transmission of data transmitted to and received from the secondary system, the ABS can release association with the secondary system.

The re-association (e.g., a handover to a neighbor AP) of the secondary system is described below.

Here, it may be assumed that the re-association of the secondary system, that is, a handover between secondary systems, is performed on only specific association.

Here, the re-association of the secondary system, that is, a handover between the secondary systems, is seamlessly performed through the primary system.

If the multi-RAT MS determines that the channel state of the secondary system now being accessed thereto is not good, the multi-RAT MS or the base station can release association with the secondary system now being accessed thereto and request a handover (HO) to another secondary system.

That is, the ABS informs the multi-RAT MS that there is no longer data transmitted and received through a current serving secondary system by sending an SS-CMD message to the multi-RAT MS. Next, the ABS instructs the multi-RAT MS to transmit and receive existing transmitted data through the primary system. If the transmission of the existing data is completed, the ABS instructs the multi-RAT MS to transmit and receive data to and from a new secondary system. That is, a seamless handover between the secondary systems can be performed through the primary system.

Furthermore, when the multi-RAT MS performs a handover between primary systems, if the coverage of the secondary system is located at the boundary of the primary systems, the multi-RAT MS can perform a handover between the primary systems seamlessly by using the secondary system.

Furthermore, if the multi-RAT MS moves within the primary system, for example, WiMAX coverage at high moving speed, the base station can instruct the multi-RAT MS not to access the secondary system although the multi-RAT MS has entered the coverage of the secondary system. That is, this management of the secondary system can be performed based on the speed of the multi-RAT MS.

FIG. 3 is another flowchart showing a method of a multi-RAT MS transmitting and receiving data through a primary system and a secondary system.

Referring to FIG. 3, at step S310, the multi-RAT MS performs an initial network entry process with a base station (ABS) (S310). Here, the multi-RAT MS and the base station can inform the other party that they support multi-RAT through the initial network entry process.

Information informing that the multi-RAT MS or the base station supports multi-RAT can be transmitted through a registration request or registration response (REG-REQ/RSP) message.

At step S320, the multi-RAT MS performs a multi-RAT capability negotiation process with the base station (ABS) in order to access an AP (S320). Here, the multi-RAT MS transmits control information, indicating a specific traffic characteristic or a specific quality of service (QoS) type on which data is preferred to be transmitted and received through the AP, to the base station (S321). Here, the control information can be transmitted through a multi-system request message.

As shown in FIG. 3, if the control information indicates service in which a traffic characteristic requires a data rate of 10 Mbps or more, it indicates that a service flow generated for traffic transmission that satisfies the traffic characteristic preferably is transmitted and received through the AP.

The service in which the traffic characteristic requires a data rate of 10 Mbps or more corresponds to an embodiment, and the traffic characteristic can indicate a QoS type value, such as the best effort.

Furthermore, the multi-RAT MS can transmit and receive data for a service flow, not requiring a traffic characteristic having a data rate of 10 Mbps or more, to and from the base station, and the data may be transmitted and received through the AP by the determination of the base station.

Data for a service flow '0' can be transmitted and received to and from the base station.

Next, the multi-RAT MS and the base station can newly generate a service flow '1', requiring a data rate of 10 Mbps or more, through a dynamic service addition (DSA) process (S330).

Next, the multi-RAT MS can transmit and receive data, corresponding to the newly generated service flow '1', to and from the AP through steps S340 and S350.

Sep S350 is described in more detail. The base station transmits a secondary system command (SS-CMD) message, instructing access an AP 2 and the transmission and reception of the data for the service flow '1' to and from the AP 2, to the multi-RAT MS (S351). Here, information included in the SS-CMD message and indicating the transmission and reception of the data for the service flow '1' to and from the AP 2 means acknowledgement for control information transmitted from the multi-RAT MS to the base station.

Next, the multi-RAT MS performs access to the AP 2 (S352) and transmits a secondary system indication (SS-IND) message, informing that the multi-RAT MS has been associated with the AP 2, to the base station (S353).

Next, the multi-RAT MS performs communication with the base station in the case of data corresponding to the service flow '0' (S354) and performs communication with the AP 2 in the case of data corresponding to the service flow '1' (S355).

An AP (secondary system, second base station) scanning procedure performed by a multi-RAT MS based on information about a preferred AP which is proposed according to embodiments of the present invention is described in detail below.

The first base station is called an 'ABS' and the second base station is called an 'AP', for convenience of description.

Prior to the description of the AP scanning procedure of the multi-RAT MS proposed according to embodiments of the present invention, the following matters are first assumed.

1. An ABS knows information about APs belonging to its own coverage.

In this case, the ABS may know information about all public APs belonging to its own coverage, but may not know information about a private AP.

2. If a multi-RAT MS has entered the coverage of an ABS to which a preferred AP belongs, in most cases, there is a good possibility that the multi-RAT MS may be present in the area of the preferred AP.

FIG. 4 is a flowchart showing a scanning procedure performed by a multi-RAT MS according to an embodiment of the present invention.

Referring to FIG. 4, the multi-RAT MS performs a network (re)entry process with an ABS (S410). For step of S410, reference can be made to step S210 of FIG. 2 or step S310 of FIG. 3.

Next, the multi-RAT MS performs a multi-RAT capability negotiation process with the ABS (S420). Here, the multi-RAT MS can transmit control information indicating a preferred AP with which the multi-RAT MS wants to communicate to the ABS (S421).

For example, the control information can be transmitted through a multi-RAT request/response message that is transmitted and received through a multi-RAT capability negotiation process.

Furthermore, the preferred AP corresponding to the control information can be a public AP or a private AP.

Here, if the preferred AP is a public AP, the multi-RAT MS can transmit a service set identifier (SSID), a basic service set identifier (BSSID), or a media access control (MAC) address corresponding to the public AP.

That is, if the preferred AP is a public AP, the multi-RAT MS can transmit a preferred SSID or a specific BSSID or MAC address of a frequently accessed AP (e.g., a café, home, a school, or a company).

Here, if the multi-RAT MS transmits the SSID of the preferred AP, the multi-RAT MS can transmit the SSID through an initial network entry process with the ABS and the SSID can be shared between the ABS and the AP over a backbone network.

Furthermore, if the multi-RAT MS transmits the BSSID or MAC address of the preferred AP, the BSSID or MAC address can be transmitted through initial network entry with the ABS and may be transmitted only when the multi-RAT MS enters an ABS to which the preferred AP belongs.

Furthermore, if the preferred AP is a private AP, the multi-RAT MS can transmit a BSSID or MAC address corresponding to the private AP.

Here, since the private AP can be mobile, the BSSID or MAC address of the private AP can be transmitted through a network entry process with the ABS and the ABS can be shared with the AP over a backbone network.

Next, the ABS determines whether or not the control information received from the multi-RAT MS, that is, the preferred AP transmitted by the multi-RAT MS, has been registered with the ABS.

Here, if the preferred AP has been registered with the ABS (S430), the ABS can instruct the multi-RAT MS to be associated (set up) with the preferred AP or can instruct the multi-RAT MS to periodically scan the preferred AP, and a detailed process thereof is described with reference to FIG. 5 to be described later.

Next, if a multi-RAT scan command message that instructs scanning for the preferred AP (AP 2 in the case of FIG. 4) is received from the ABS, the multi-RAT MS performs scanning on the preferred AP (S440, S441).

Next, the multi-RAT MS reports the results of the scanning to the ABS (S442) and then performs association with the preferred AP. For a detailed process of the association, reference can be made to FIG. 2 or 3.

Next, the multi-RAT MS transmits and receives data to and from the ABS and the preferred AP.

Figure 5:
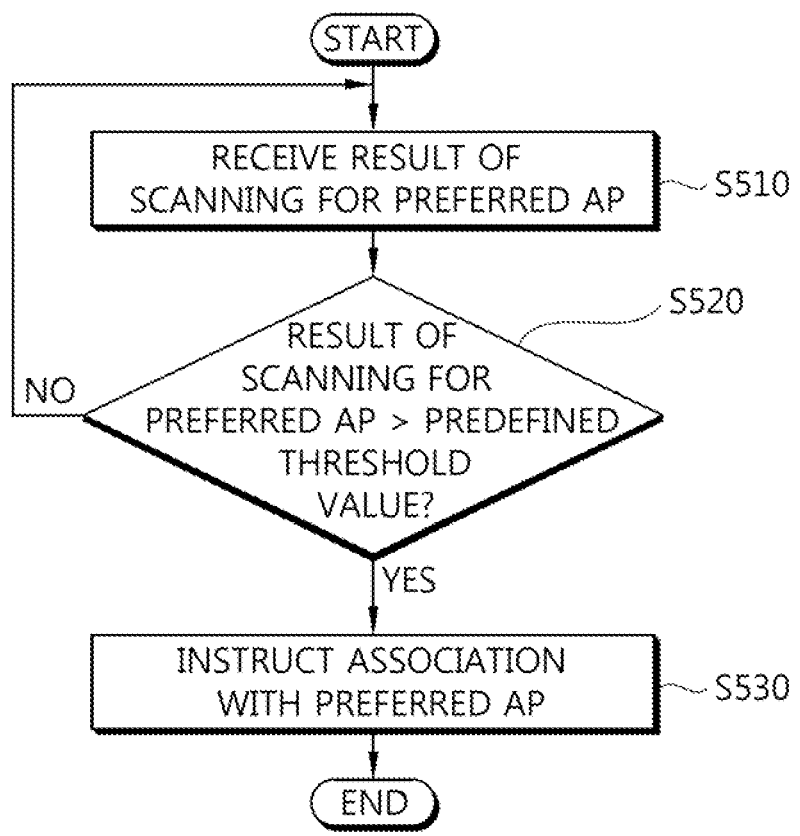
FIG. 5 is a flowchart showing an operating method of a first base station for controlling the scanning procedure of a multi-RAT MS according to an embodiment of the present invention.

FIG. 5 is a flowchart showing an operating method of a first base station for controlling the scanning procedure of a multi-RAT MS according to an embodiment of the present invention.

Referring to FIG. 5, a first base station, that is, an ABS, receives scanning results for a preferred AP from a multi-RAT MS (S510). Here, the scanning results for the preferred AP can be transmitted through a multi-RAT scan report message.

Next, the ABS determines whether or not a scan result value for the preferred AP (e.g., signal intensity for the preferred AP) is greater than a threshold value previously defined in the ABS (S520).

If, as a result of the determination, it is determined that the scan result value for the preferred AP is greater than the pre-defined threshold value, the ABS instructs the multi-RAT MS to be associated with the preferred AP (S530).

If, as a result of the determination, however, it is determined that the scan result value for the preferred AP is smaller than the pre-defined threshold value, the ABS transmits an instruction, instructing the multi-RAT MS to periodically scan the preferred AP, to the multi-RAT MS. That is, the ABS instructs periodic scanning so that the multi-RAT MS can be associated with the AP rapidly.

Here, reference can be made to FIGS. 2 to 4 for procedures necessary for the multi-RAT MS to transmit and receive data to and from the ABS and the AP at the same time.

The embodiment of the present invention and their modifications can be combined. Therefore, each embodiment can be implemented in combination as well as in its own. These combinations may be obvious to those skilled in the art from the description of the specification, and so detailed description thereof is omitted. Although the description on the combination has not been included in the specification, those combinations of embodiments shall be interpreted to be within the scope of the present invention.

The above-described embodiments and modifications may be made by various means, for example, in hardware, firmware, software, or in a combination thereof.

When implemented in hardware, the methods according to the embodiments of the present invention may be embodied by one or more application specific integrated circuits (ASICs), digital signal processors (DSPs), digital signal processing devices (DSPDs), programmable logic devices (PLDs), field programmable gate arrays (FPGAs), processors, controllers, microcontrollers, or microprocessors.

When implemented in firmware or software, the methods according to the embodiments of the present invention may be embodied in modules, procedures or functions that perform the above-described functions or operations. The software codes may be stored in a memory unit and driven by a processor. The memory unit may be positioned in or outside of the processor and may transmit or receive data to/from the processor by various known means.

For example, the methods according to the embodiments of the present invention may be stored in a storage medium (for example, an internal memory, a flash memory, a hard disk, etc.) and may be implemented as codes or commands in a software program that may be executed by a processor (for example, a microprocessor). This will be described with reference to FIG. 7.

Figure 6:
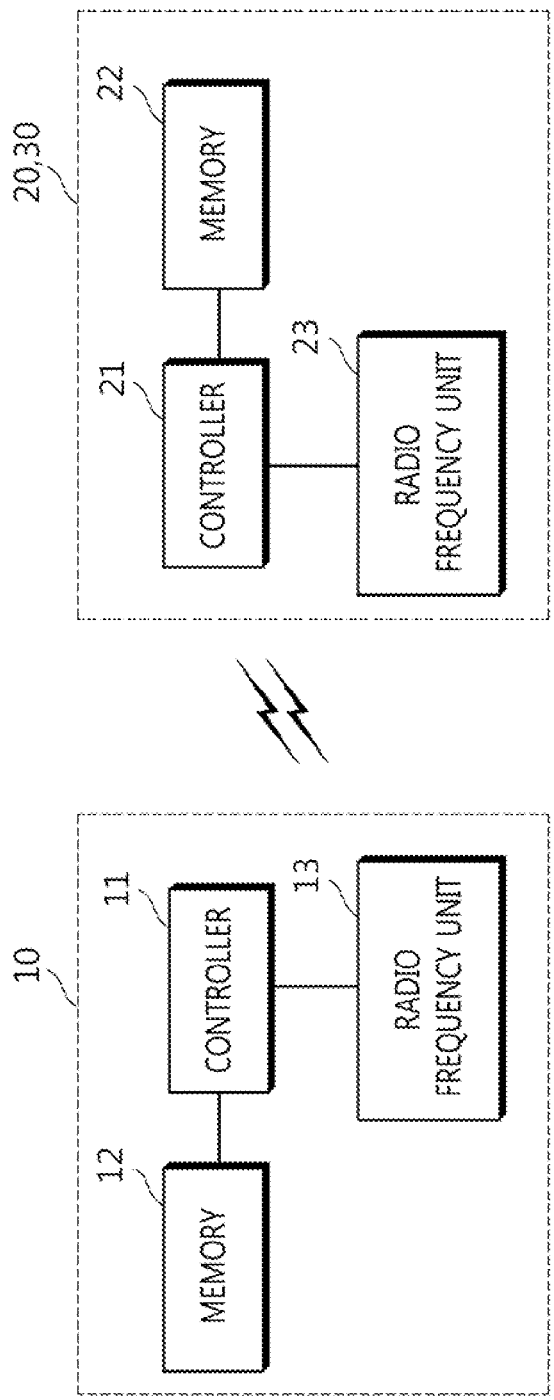
FIG. 6 is a block diagram showing internal structures of an MS and a BS in a wireless access system according to an embodiment of the present invention.

FIG. 6 is a block diagram showing internal structures of an MS and a BS in a wireless access system according to an embodiment of the present invention.

An MS 10 includes a controller 11, a memory 12, and a radio frequency (RF) unit 13.

The MS 10 can be fixed or mobile and can be called another terminology, such as user equipment (UE), a user terminal (UT), a subscriber station (SS), a wireless device, or an advanced mobile station (AMS). Furthermore, the MS includes the multi-RAT MS.

Further, the MS also includes a display unit, a user interface unit, etc.

The controller 11 implements the proposed functions, procedures, and/or methods. Layers of a wireless interface protocol may be implemented by the controller 11.

The memory 12 is coupled to the controller 11, and stores a protocol or parameter for performing wireless communication. That is, the memory 12 stores an operating system of the MS, an application, and a general file.

The RF unit 13 is coupled to the controller 11, and transmits and/or receives an RF signal.

In addition, the display unit displays a variety of information of the MS, and may be a well-known element such as liquid crystal display (LCD), organic light emitting diodes (OLED), etc. The user interface unit may be constructed by combining well-known user interfaces such as a keypad, a touch screen, etc.

ABS 20, 30 includes a controller 21, a memory 22, and an RF unit 23.

Here, the BS 20, 30 commonly refers to a fixed station communicating with the MS, and the base station can be called another terminology, such as a NodeB, a base transceiver system (BTS), or an access point. One or more cell can be present in one base station.

The controller 21 implements the proposed functions, procedures, and/or methods. Layers of a wireless interface protocol may be implemented by the controller 21.

The memory 22 is coupled to the controller 21, and stores a protocol or parameter for performing wireless communication.

The RF unit 23 is coupled to the controller 21, and transmits and/or receives an RF signal.

The controllers 11 and 21 may include an application-specific integrated circuit (ASIC), a separate chipset, a logic circuit, and/or a data processing unit. The memories 12 and 22 may include a read-only memory (ROM), a random access memory (RAM), a flash memory, a memory card, a storage medium, and/or other equivalent storage devices. The RF units 13 and 23 may include a baseband circuit for processing an RF signal. When the embodiment of the present invention is implemented in software, the aforementioned methods can be implemented with a module (i.e., process, function, etc.) for performing the aforementioned functions. The module may be stored in the memories 12 and 22 and may be performed by the controllers 11 and 21.

The memories 12 and 22 may be located inside or outside the controllers 11 and 21, and may be coupled to the controllers 11 and 21 by using various well-known means.

In addition, the terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms are intended to include the plural forms as well, unless the context clearly indicates otherwise. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

It will be understood that although the terms "first" and "second" are used herein to describe various elements, these elements should not be limited by these terms. These terms are only used to distinguish one element from another element. For example, a first component may be termed a second component, and similarly, a second component may be termed a first component without departing from the scope of the present invention.

When a component is mentioned as being "connected" to or "accessing" another component, this may mean that it is directly connected to or accessing the other component, but it is to be understood that there are no intervening components present. On the other hand, when a component is mentioned as being "directly connected" to or "directly accessing" another component, it is to be understood that there are no intervening components present.

The following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparently understandable that claims failing to be explicitly cited in the appended claims are combined to construct new embodiments or can be included as new claims by amendment after filing the application.

What is claimed is:

1. A method of a multi-radio access technology (multi-RAT) mobile station transmitting and receiving data to and from a first base station supporting first radio access technology and a second base station supporting second RAT in a radio access system supporting multiple RATs, the method comprising:
    performing a network entry process with the first base station;
    transmitting a multi-RAT capability negotiation request message, comprising control information indicating a second base station preferred to communicate with, to the first base station, the preferred second base station being one of one or more second base stations included in a coverage of the first base station;
    receiving a multi-RAT capability negotiation response message, corresponding to the multi-RAT capability negotiation request message, from the first base station;
    receiving information related to the second base station preferred to communicate with from the first base station,
    wherein the information related to the preferred second base station is at least one of a beacon interval, a scan type, probe delay, a list of channels to be scanned, and information about a minimum or maximum time during which scanning has to be performed in each channel;
    performing a scanning procedure only on the preferred second base station of the one or more second base stations included in a coverage of the first base station according to the received information;
    performing an access procedure with any one of the one or more second base stations; and
    simultaneously transmitting and receiving data to and from the first base station and the second base station accessed through the access procedure.

2. The method of claim 1, wherein the one or more base stations and any one of the one or more base stations is a second base station corresponding to the control information.

3. The method of claim 1, wherein the second base station preferred to communicate with is a public or private access point (AP).

4. The method of claim 3,
    wherein the control information is a service set identifier (SSID), a basic service set identifier (BSSID), or a media access control (MAC) address if the second base station preferred to communicate with is a public AP, and
    wherein the control information is a BSSID or MAC address if the second base station preferred to communicate with is a private AP.

5. The method of claim 1, further comprising performing a dynamic service process with the first base station in order to add or change a service flow,
    wherein the control information is information indicating the added or changed service flow and the second base station preferred to communicate with.

6. The method of claim 1, wherein the first RAT is RAT supporting IEEE 802.16, and
    wherein the second RAT is RAT supporting IEEE 802.11.

7. A method of a first base station controlling data transmission and reception between a mobile station and a second base station in a radio access system comprising the mobile station supporting multi-radio access technology (multi-RAT), the first base station supporting first RAT, and the second base station supporting second RAT, the method comprising:
    performing a network entry process with the mobile station;
    receiving a multi-RAT capability negotiation request message, comprising control information indicating a second base station preferred to communicate with, from the mobile station, the preferred second base station being one of one or more second base stations included in a coverage of the first base station;

transmitting a multi-RAT capability negotiation response message, corresponding to the multi-RAT capability negotiation request message, to the mobile station; and transmitting a multi-RAT scan command message, instructing scanning to be performed on the preferred second base station corresponding to the control information, to the mobile station, wherein the multi-RAT scan command message includes information related to the preferred second base station, wherein the information related to the preferred second base station is at least one of a beacon interval, a scan type, probe delay, a list of channels to be scanned, and information about a minimum or maximum time during which scanning has to be performed in each channel, wherein a scanning procedure is performed only on the preferred second base station of the one or more second base stations included in a coverage of the first base station according to the received information, wherein an access procedure is performed with any one of the one or more second base stations, wherein data is simultaneously transmitted and received from the first base station and the second base station accessed through the access procedure.

8. The method of claim 7, wherein the multi-RAT scan command message is transmitted to the mobile station if the second base station corresponding to the control information has been registered.

9. The method of claim 7, further comprising:

receiving a result of the scanning on the second base station, corresponding to the control information, from the mobile station; and comparing the result of the scanning with a predefined threshold value.

10. The method of claim 9, further comprising transmitting a message, instructing an association procedure to be performed with the second base station corresponding to the control information, to the mobile station, if, as a result of the comparison, the result of the scanning is greater than the predefined threshold value.

11. The method of claim 9, further comprising transmitting a message, instructing periodic scanning for the second base station corresponding to the control information, to the mobile station, if, as a result of the comparison, the result of the scanning is smaller than the predefined threshold value.

12. A mobile station for transmitting and receiving data to and from a first base station supporting first radio access technology (RAT) and a second base station supporting second RAT in a radio access system supporting multiple RATs, the mobile station comprising:

a radio frequency unit configured to transmit and receive radio signals; and a controller coupled with the radio communication unit, and configured to:

perform a network entry process with the first base station;

transmit a multi-RAT capability negotiation request message, comprising control information indicating a second base station preferred to communicate with, to the first base station, the preferred second base station being one of one or more second base stations included in a coverage of the first base station;

receive a multi-RAT capability negotiation response message, corresponding to the multi-RAT capability negotiation request message, from the first base station;

receive information related to the second base station preferred to communicate with from the first base station, wherein the information related to the preferred second base station is at least one of a beacon interval, a scan type, probe delay, a list of channels to be scanned, and information about a minimum or maximum time during which scanning has to be performed in each channel;

perform a scanning procedure only on the preferred second base station of the one or more second base stations included in a coverage of the first base station according to the received information;

perform an access procedure with any one of the one or more second base stations; and simultaneously transmit and receive data to and from the first base station and the second base station accessed through the access procedure.

\* \* \* \* \*